(12) United States Patent
Emens et al.

(10) Patent No.: US 6,564,257 B1
(45) Date of Patent: May 13, 2003

(54) REPOSITORY PROTECTION BY URL EXPIRATION

(75) Inventors: Michael Lawrence Emens, San Jose, CA (US); Reiner Kraft, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/458,466

(22) Filed: Dec. 9, 1999

(51) Int. Cl.[7] ............................................... G06F 13/00
(52) U.S. Cl. ........................ 709/219; 709/225; 709/329; 707/10
(58) Field of Search ................................ 709/217, 219, 709/223, 225, 313, 329; 707/104, 10

(56) References Cited

U.S. PATENT DOCUMENTS

| | | | |
|---|---|---|---|
| 5,761,436 A | 6/1998 | Nielsen | 395/200.75 |
| 5,793,964 A | 8/1998 | Rogers et al. | 395/200.32 |
| 5,812,776 A | 9/1998 | Gifford | 395/200.47 |
| 5,855,020 A | 12/1998 | Kirsch | 707/10 |
| 5,864,852 A | 1/1999 | Luotonen | 707/10 |
| 5,870,546 A | 2/1999 | Kirsch | 395/200.33 |
| 5,870,559 A | 2/1999 | Leshem et al. | 395/200.54 |
| 5,878,219 A | 3/1999 | Vance, Jr. et al. | 395/200.47 |
| 6,078,866 A | * 6/2000 | Buck et al. | 702/2 |
| 6,157,930 A | * 12/2000 | Ballard et al. | 707/203 |
| 6,360,254 B1 | * 3/2002 | Linden et al. | 709/219 |

FOREIGN PATENT DOCUMENTS

WO     WO97/29414     8/1997

OTHER PUBLICATIONS

"Persistent Context for World Wide Web Browsers", IBM Technical Disclosure Bulletin, vol. 40, No. 02, Feb. 1997, pp. 215–216.

"Virtual URL's for Browsing and Searching Large Information Spaces", Research Disclosure, Sep. 1998, pp. 1238–1239.

* cited by examiner

*Primary Examiner*—Viet D. Vu
(74) *Attorney, Agent, or Firm*—Alison D. Mortinger

(57) ABSTRACT

Protecting a searchable repository containing a document locator when a user searches the repository for the document locator, by replacing the document locator with a unique time-sensitive key. The document locator may be a uniform resource locator, or URL. A user search request is intercepted, each URL in the original search result is extracted and replaced with a key, and the altered result returned to the user. When the user selects the key from the search result within the expiration interval, the associated URL and document are able to be retrieved.

24 Claims, 3 Drawing Sheets

REPOSITORY PROTECTION BY URL EXPIRATION

TECHNICAL FIELD

This invention relates to repository security, and more particularly to the protection of searchable repositories such as those found on the Internet.

BACKGROUND OF THE INVENTION

Internet search engines (e.g. Hotbot, Yahoo) spend a great deal of time and effort developing and maintaining repositories of information stored on their own servers. These repositories contain summary data about network resources such as documents or web pages found on the Internet. The data includes links, also called hyperlinks or uniform resource locators (URLs) that are essentially addresses where the documents can be found, as the documents are not stored in the repositories but on other servers.

The repositories are created and maintained by using a web crawler or gatherer to access documents on a large scale from a large number of servers on the Internet. A crawler or gatherer typically will perform an initial query to obtain an initial resultant set of documents, download and analyze the results to generate the summary data, extract and store the URLs contained within, query the URLs for more results, and proceed in a recursive process to gather as many URLs as possible.

The key to obtaining the URLs is in a document's page specification, which is how the page will be assembled when viewed. A common page specification language is Hyper-Text Markup Language, or HTML. In HTML, the URL is coded as an HREF tag. Other page specification languages use similar tags to indicate the presence of a URL.

Crawling is an expensive and time-consuming process, and thus the search engine repositories (as well as other Internet or intranet repositories or databases) are very valuable, as millions of end users access them every day. End users access the search engine's repository by means of a query. The search engine presents results in the form of a list of summary data, and the user chooses the appropriate item from among the results. Users thus typically access documents in a limited manner, sequentially searching and examining documents until the desired item is found, in contrast with the web crawlers or gatherers, which access documents in a wholesale fashion.

Unfortunately, in addition to building a repository or database, a web crawler or gather can be used to systematically extract and replicate all the information from someone else's repository or database, by the same querying/parsing/extracting process described above. Thus it is desirable to provide a means to protect an Internet or intranet repository or database from wholesale access yet still provide limited access for the typical end user.

SUMMARY OF THE INVENTION

A method and system for protecting a searchable repository containing a document locator when a user searches the repository for the document locator, by replacing the document locator with a unique time-sensitive key are described. The document locator may be a uniform resource locator, or URL. A user search request is intercepted, each URL in the original search result is extracted and replaced with a key, and the altered result returned to the user. When the user selects the key from the search result within the expiration interval, the associated URL and document are able to be retrieved.

For a fuller understanding of the nature and advantages of the present invention, reference should be made to the following detailed description taken together with the accompanying figures.

DESCRIPTION OF THE PREFERRED EMBODIMENTS

The present invention is described herein in the context of an Internet application merely as a specific example, and is not meant to limit applicability of the invention to Internet technology. Those skilled in the art will understand that the invention is broadly applicable to any method in which it is desirable to protect a searchable repository containing a document locator when a user searches the repository for the document locator, by replacing the document locator with a unique time-sensitive key, including but not limited to Intranet and database applications.

In order to protect an Internet or intranet repository or database (henceforth called repository) associated with a manager such as a server (e.g. a search engine's repository) from wholesale access and replication yet still provide limited access for the typical end user, the document locator (e.g. URLs in the world wide web portion of the Internet) are replaced with a random unique key which can only be resolved and mapped at the server. The key is associated with a time indicator, so that the URL is valid only for a limited time (for example 10 minutes) which can be set as desired. After the time interval expires, the URL expires.

This will not present a problem for the typical user. The user will query the server, analyze the search results within a few minutes and view or download the desired network resource. Once the resource is downloaded, it may be book marked for further review or saved to local storage.

The gatherer, however, will definitely have a problem. The gatherer trying to access the server to extract and replicate the associated repository will query, download and analyze the results, extract and store the URLs, and then query the URLs for more URLs, etc. However, the URLs now do not contain the location of the documents, but must be resolved and mapped at the server. Because the URLs expire within a short amount of time (much less than the time for the gatherer to do its work), the stored collection of URLs will be worthless.

Figure 1:
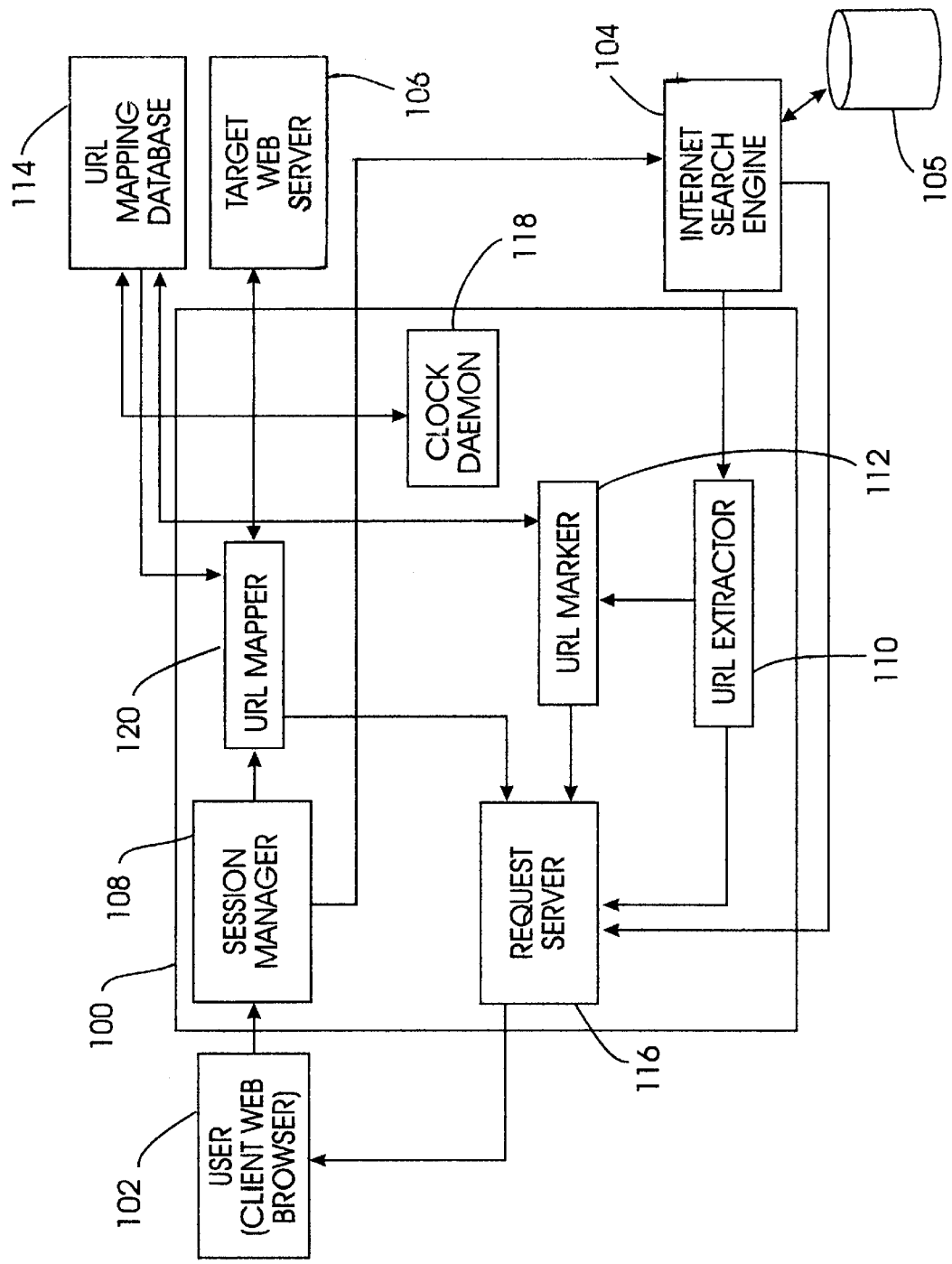
FIG. 1 shows the architecture for the Repository Protector.

FIG. 1 shows the architecture for the Repository Protector 100. A user 102 (on a browser such as Netscape Navigator) interacts with an Internet Search Engine 104 with an associated repository 105 and a Target Web Server 106. The interaction in the form of requests is intercepted (transparent to the user) by Repository Protector 100.

Repository Protector 100 has a Session Manager 108 for creating and managing the session. Because the commonly used Internet protocol HTTP (HyperText Transfer Protocol) is "stateless" there is no concept of a session, i.e. there is no built-in way to associate a series of requests with a client. Ways around this include the use of "cookies" to place information on the user's computer, however cookies are found to be undesirable by many users. Here, in order to create and manage a session, Session Manager 108 adds information onto each request in order to form an association with the user's browser. Once a session is established, Session Manager 108 determines the type for each request it receives.

If a search request is detected, (i.e. a query with search terms without direct reference to a URL), Session Manager 108 forwards the request to Internet Search Engine 104. The result is a document from Search Engine 104 which typically includes a list of URLs and summary data (i.e. a short description) of each document associated with a URL. The result document is received by URL Extractor 110, which parses and analyzes it in order to extract the original URLs. The extracted URLs are passed to URL Marker 112, and Extractor 110 inserts a label in each location within the document where a URL was extracted. The label is used later on by Request Server 116.

URL Marker 112 generates a unique key for each of the URLs received from URL Extractor 110. This is accomplished using well-known hash technology. Then Marker 112 queries URL Mapping Database 114. If the generated key is not contained in Database 114, the key is stored along with the corresponding URL, and a time indicator such as a time stamp. If the key is already in Database 114, Marker 112 will rehash and produce another key until it is possible to store a unique key. After each URL has a unique key, URL Marker 112 passes the list of unique keys (note: not URLs anymore) to Request Server 116.

Request Server 116 forwards all data from the other components of Repository Protector 100 to user 102, using the appropriate protocol. Server 116 also merges the search result from Search engine 104 (minus the URLs) with the unique keys received from URL Marker 112. The locations to put the keys within the result page were previously marked with labels by URL Extractor 110. Thus user 102 receives a search result page (or pages) that has unique time-sensitive keys substituted for the URLs.

The URLs are stored in URL Mapping Database 114, which contains tuples consisting of key, URL, and time indicator. Clock Daemon 118 performs periodic sweeps (e.g. every minute) through Mapping Database 114, and increases each tuple's time indicator accordingly. This is achieved by iterating through all the data records. Before Clock Daemon 118 increases a time indicator, it first checks to see whether the expiration interval has been reached (for example 10 minutes). If the expiration has been reached, the tuple (record containing key, URL, and time indicator) will be deleted. Alternately, the time indicator may simply be an integer which starts at the expiration interval and is decremented with each sweep of the Clock Daemon until it reaches zero, when the tuple is deleted.

If a URL request (i.e. the user chooses what appears to be a URL from the search results) is detected by Session Manager 108, the request is passed to URL Mapper 120. Note that due to the extracting/marking process described above, the URL request contains a key, not a URL. URL Mapper 120 then queries URL Mapping Database 114 using the provided key in order to retrieve the corresponding URL. If the request is made within the expiration interval, the key is resolved and the URL retrieved from URL Mapping Database 114. Mapper 120 then forwards a request for the URL to Target Web Server 106, and document passed to user 102 via Request Server 116. If the expiration interval has passed, the key is no longer in URL Mapping Database 114, and the key can no longer be resolved. An error message is then generated and forwarded to Request Server 116, which passes it to user 102. In this case, it is no longer possible to retrieve the document until user 102 performs a new search query, which generates a new key, which then can be used to retrieve the document.

Figure 2A:
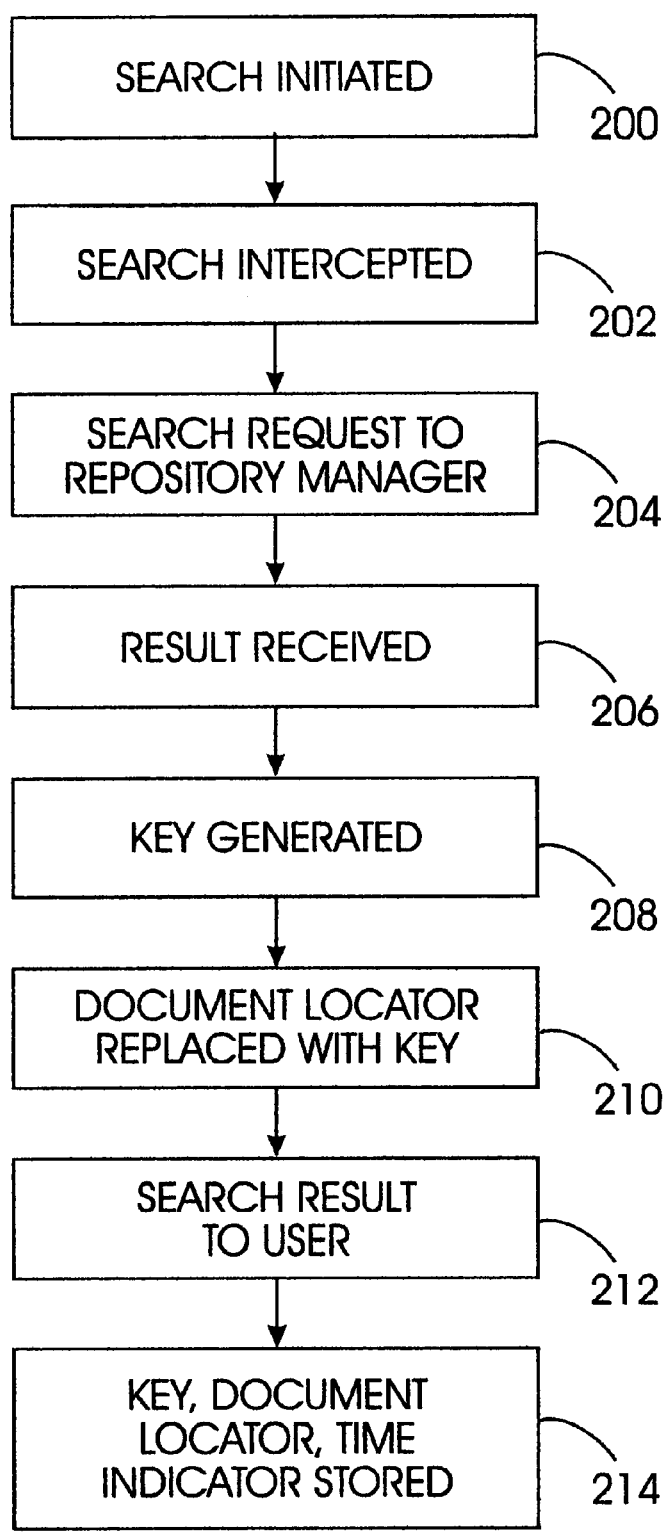
FIGS. 2a and 2b show the associated method steps; each in accordance with the present invention.
Figure 2B:
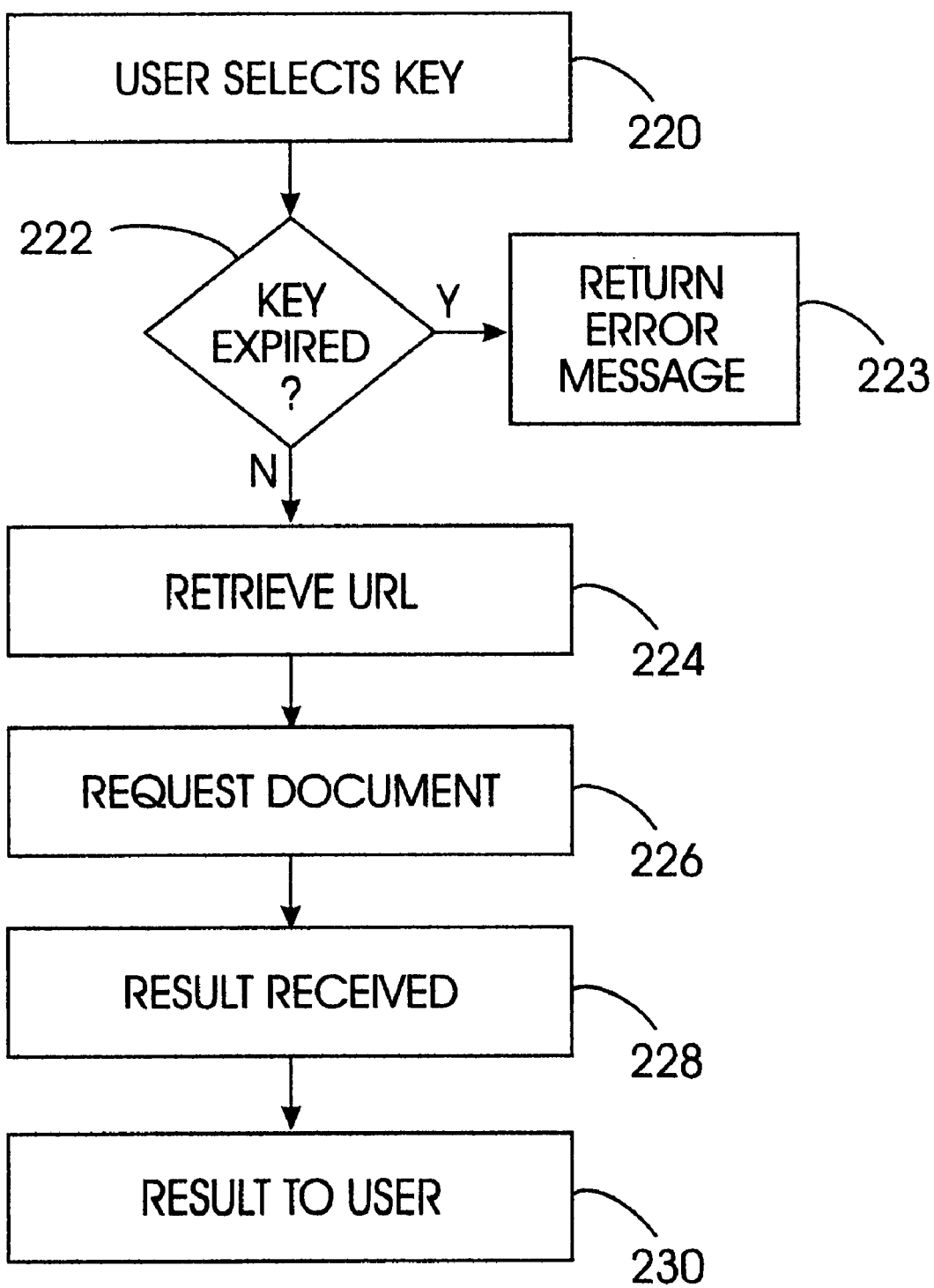

FIGS. 2a and 2b show the method steps of the invention. In FIG. 2a, step 200, a user initiates a search on a searchable repository, and in step 202 the search request is intercepted. The search request is then forwarded to the repository manager in step 204. Here, the Internet Search Engine manages its associated repository of URLs and summary data about the URLs, however any searchable repository of documents which has document locators will suffice. In step 206, a search result is received, and in step 208 a unique time sensitive key is generated for each document locator, for example by associating a time indicator with a unique key. Then, in step 210, each document locator is replaced with its associated key to produce an altered search result, which is returned to the user in step 212. In step 214, the associated key, document locator, and time indicator are stored. In FIG. 2b, step 220, the user selects a key from the altered search result. If the key has not expired in step 222, the URL associated with the key is retrieved in step 224, and in step 226 the document associated with the URL is requested. The result (either the document or an error message indicating that the document is unavailable) is received from the web server in step 228, and returned to the user in step 230. If, in step 222, the key has expired, then an error message is returned to the user in step 223.

The logic of the present invention may be executed by a processor as a series of computer-executable instructions. The instructions may be contained on any suitable data storage device with a computer accessible medium, such as but not limited to a computer diskette having a computer usable medium with program code stored thereon, a DASD array, magnetic tape, conventional hard disk drive, electronic read-only memory, or optical storage device.

In summary, a method and system have been described which provide a means to protect an Internet or intranet repository or database from wholesale access yet still provide limited access for the typical end user.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method of protecting a searchable repository containing a document locator when a user searches the repository for the document locator, comprising:

intercepting a user search request;

forwarding the search request to a manager of the repository;

receiving an original search result;

associating a unique time-sensitive key with each document locator in the original search result and replacing each document locator with its associated key to produce an altered search result; and returning the altered search result to the user.

2. The method of claim 1 wherein the document locator is a uniform resource locator (URL).

3. The method of claim 2 wherein the searchable repository is a repository associated with a server.

4. The method of claim 1 wherein the user selects a key from the altered search result, and the key has not expired, comprising the steps of:

retrieving the URL associated with the key, requesting the document associated with the URL;

receiving a result based on the document request, and returning the result to the user.

5. The method of claim 1 wherein the unique time-sensitive key is generated by associating a time indicator with a unique key.

6. The method of claim 5 further comprising the step of storing the associated key, document locator, and time indicator.

7. The method of claim 6 further comprising periodically updating the time indicator until an expiration interval has been reached, then deleting the associated key, document locator, and time indicator from storage.

8. The method of claim 4 wherein the user selects a key from the altered search result, and the key has expired, comprising the step of returning an error message to the user.

9. A system for protecting a searchable repository containing a document locator when a user searches the repository for the document locator, comprising:

means for intercepting a user search request;

means for forwarding the search request to a manager of the repository;

means for receiving an original search result;

means for associating a unique time-sensitive key with each document locator in the original search result and replacing each document locator with its associated key to produce an altered search result; and means for returning the altered search result to the user.

10. The system of claim 9 wherein the user selects a key from the altered search result, and the key has not expired, comprising:

means for retrieving the URL associated with the key, means for requesting the document associated with the URL;

means for receiving a result based on the document request, and means for returning the result to the user.

11. The system of claim 9 wherein the document locator is a uniform resource locator (URL).

12. The system of claim 11 wherein the searchable repository is a repository associated with a server.

13. The system of claim 10 wherein the user selects a key from the altered search result, and the key has expired, comprising means for returning an error message to the user.

14. The system of claim 9 wherein the unique time-sensitive key is generated by associating a time indicator with a unique key.

15. The system of claim 14 further comprising a storage means for storing the associated key, document locator, and time indicator.

16. The system of claim 15 further comprising means for periodically updating the time indicator until an expiration interval has been reached, then deleting the associated key, document locator, and time indicator from storage.

17. A program storage device accessible by a machine, tangibly embodying a program of instructions executable by the machine to perform the method steps for protecting a searchable repository containing a document locator when a user searches the repository for the document locator, said method steps comprising:

intercepting a user search request;

forwarding the search request to a manager of the repository;

receiving an original search result;

associating a unique time-sensitive key with each document locator in the original search result and replacing each document locator with its associated key to produce an altered search result; and returning the altered search result to the user.

18. The device of claim 17 wherein the user selects a key from the altered search result, and the key has not expired, comprising the steps of:

retrieving the URL associated with the key, requesting the document associated with the URL;

receiving a result based on the document request, and returning the result to the user.

19. The device of claim 18 wherein the user selects a key from the altered search result, and the key has expired, comprising the step of returning an error message to the user.

20. The device of claim 17 wherein the document locator is a uniform resource locator (URL).

21. The device of claim 20 wherein the searchable repository is a repository associated with a server.

22. The device of claim 17 wherein the unique time-sensitive key is generated by associating a time indicator with a unique key.

23. The device of claim 22 further comprising the step of storing the associated key, document locator, and time indicator.

24. The device of claim 23 further comprising periodically updating the time indicator until an expiration interval has been reached, then deleting the associated key, document locator, and time indicator from storage.

* * * * *